(12) United States Patent
Pfeiffer et al.

(10) Patent No.: US 10,065,642 B2
(45) Date of Patent: Sep. 4, 2018

(54) MOTOR VEHICLE HAVING A DISTANCE-RELATED SPEED CONTROL SYSTEM AND HAVING A LANE DEPARTURE WARNING SYSTEM

(71) Applicant: Bayerische Motoren Werke Aktiengesellschaft, Munich (DE)

(72) Inventors: Andreas Pfeiffer, Holzkirchen (DE); Thomas Burtsche, Warngau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/868,497

(22) Filed: Sep. 29, 2015

(65) Prior Publication Data

US 2016/0016584 A1    Jan. 21, 2016

Related U.S. Application Data

(63) Continuation of application No. PCT/EP2014/056404, filed on Mar. 31, 2014.

(30) Foreign Application Priority Data

Apr. 2, 2013 (DE) .................. 10 2013 205 788

(51) Int. Cl.
   *B60W 30/16* (2012.01)
   *B60W 50/14* (2012.01)
(52) U.S. Cl.
   CPC ............ *B60W 30/16* (2013.01); *B60W 50/14* (2013.01); *B60K 2310/264* (2013.01); *B60W 2540/20* (2013.01); *B60W 2750/308* (2013.01)
(58) Field of Classification Search
   CPC .............................. B60W 30/16; B60W 50/14
   See application file for complete search history.

(56) References Cited

U.S. PATENT DOCUMENTS

| | | | |
|---|---|---|---|
| 6,353,788 B1* | 3/2002 | Baker ............... | B60K 31/0008 340/435 |
| 2002/0177935 A1* | 11/2002 | Winner ............. | B60K 31/0008 701/93 |

(Continued)

FOREIGN PATENT DOCUMENTS

| CN | 1780746 A | 5/2006 |
|---|---|---|
| CN | 102126497 A | 7/2011 |

(Continued)

OTHER PUBLICATIONS

International Search Report (PCT/ISA/210) issued in PCT Application No. PCT/EP2014/056404 dated Jun. 12, 2014 with English-language translation (four (4) pages).

(Continued)

*Primary Examiner* — Khoi H Tran
*Assistant Examiner* — Donald J Wallace
(74) *Attorney, Agent, or Firm* — Crowell & Moring LLP

(57) ABSTRACT

A motor vehicle includes a distance related speed control system, wherein if the motor vehicle is following a vehicle driving in front, a target distance from the vehicle driving in front chosen by the driver is generally set, and wherein for a distance-shortening turn signal effect time when a turn signal is set, a shortened target distance is set. The motor vehicle further has a lane departure warning system, wherein a warning that is generally activated if there is a risk of an unintentional lane departure is suppressed for a specified warning-suppressing turn signal effect time after the setting of the turn signal. The warning-suppressing turn signal effect time begins simultaneously with the distance-shortening turn signal effect time, wherein these two turn signal effect times are specified to have the same length.

3 Claims, 1 Drawing Sheet

(56) References Cited

U.S. PATENT DOCUMENTS

| | | | | |
|---|---|---|---|---|
| 2006/0009910 A1* | 1/2006 | Ewerhart | ............ | B60W 30/143 |
| | | | | 701/301 |
| 2011/0106364 A1 | 5/2011 | Braeuchle et al. | | |
| 2011/0196592 A1* | 8/2011 | Kashi | .................... | B60W 30/16 |
| | | | | 701/96 |

FOREIGN PATENT DOCUMENTS

| | | |
|---|---|---|
| DE | 101 14 470 A1 | 9/2002 |
| DE | 102 05 225 A1 | 11/2003 |
| DE | 10 2008 051 700 A1 | 4/2010 |
| DE | 10 2010 041 620 A1 | 3/2012 |
| WO | WO 99/30920 A1 | 6/1999 |

OTHER PUBLICATIONS

German Search Report issued in counterpart German Application No. DE 10 2013 205 788.1 dated Jan. 14, 2014 with partial English-language translation (ten (10) pages).

Chinese Office Action issued in Chinese counterpart application No. 201480017805.5 dated Dec. 5, 2016, with English translation (Eleven (11) pages).

Chinese Office Action issued in Chinese counterpart application No. 201480017805.5 dated Aug. 3, 2017 (Five (5) pages).

\* cited by examiner

MOTOR VEHICLE HAVING A DISTANCE-RELATED SPEED CONTROL SYSTEM AND HAVING A LANE DEPARTURE WARNING SYSTEM

CROSS REFERENCE TO RELATED APPLICATIONS

This application is a continuation of PCT International Application No. PCT/EP2014/056404, filed Mar. 31, 2014, which claims priority under 35 U.S.C. § 119 from German Patent Application No. 10 2013 205 788.1, filed Apr. 2, 2013, the entire disclosures of which are herein expressly incorporated by reference.

BACKGROUND AND SUMMARY OF THE INVENTION

The invention relates to a motor vehicle having a distance-related speed control system and having a lane departure warning system.

Such systems are known per se and usually operate independently from one another in a motor vehicle. Through lack of coordination of these systems with one another, irritating vehicle reactions may occur.

The object of the invention is to coordinate the above mentioned vehicle systems to one another in one vehicle in order to achieve uniformly predictable vehicle behavior.

This and other objects are achieved by a motor vehicle according to embodiments of the invention.

The motor vehicle according to the invention comprises a distance-related speed control system wherein if the motor vehicle is following a vehicle driving in ahead of it, a target distance, chosen by the driver, from the vehicle driving ahead of it is generally set, and wherein for a distance-shortening turn signal effect time when the turn signal is set, a shortened target distance is set. The motor vehicle according to the invention further comprises a lane departure warning system, wherein a warning that is generally activated if there is a risk of unintentional lane departure is suppressed for a specified warning-suppressing turn signal effect time after the setting of the turn signal. According to the invention, the warning-suppressing turn signal effect time begins simultaneously with the distance-shortening turn signal effect time, wherein said two turn signal effect times (time periods having a defined duration) are specified to have the same length.

The invention is based on the following considerations. Motor vehicles with the systems mentioned above are offered, for example, by the applicant. One distance-related speed control system (ACC (Adaptive Cruise Control) system) known therefrom regulates the speed to a specified target value as long as no vehicle driving ahead is located within a specified detection area in front of the vehicle. If a vehicle is located within the specified detection area in front of the vehicle in question, a target distance from the vehicle driving ahead desired by the driver is set. Here, a special distance control is also provided for a driving lane change. During a driving lane change, which is detected by a set direction indicator (turn signal), the target distance to the vehicle driving ahead of it is reduced or the distance control is terminated at the time the turn signal is set, in particular to achieve a short-term acceleration. In the former case of reduced target distance, the vehicle is accelerated to reach the now smaller target distance. This function simulates the driving behavior of a driver without a system, who already begins to accelerate in the same lane prior to overtaking. After the turn signal is switched off again, the target distance is reset to the normal value. In the second case, the distance control is switched off and an acceleration control is activated. Here, the system is also given a shortened target distance as the minimum distance from the vehicle traveling ahead, upon the reaching of which the acceleration control is switched off and transferred back to the distance control.

These turn signal-dependent distance controls are ACC sub-functions in the sense of an overtaking assistance, and essentially give a temporarily shortened target distance for a time window of a certain duration, which is started by switching on the turn signal. This time window is hereinafter referred to as a "distance-shortening turn signal effect time".

Further, lane departure warning systems for motor vehicles are known which have in an electronic control unit a function module for lane tracking (lane tracking assistant) and/or a function module to prevent a collision during lane change (lane change assistant) (e.g. "TLC"=Time to Line Crossing or "HC"=Heading Control).

Depending on defined parameters, in particular depending on the current distance of the vehicle in question to the side-limiting lane markers of the lane thereof and/or depending on the (transverse) speed with which the vehicle in question approaches the side-limiting lane markers of the lane thereof, and likewise depending on defined situations of varying degrees of danger, a visual, audible or haptic warning (e.g. by display flashing, warning tone, steering wheel vibration and/or counter-steering torque) is activated. To this end, an electronic control unit assigned to the lane departure warning system is connected with corresponding sensors and actuators.

A warning of the lane departure warning system, however, can be suppressed when an intended lane change is detected at least with a certain probability. Superfluous warnings should hereby be prevented for the relief of the driver. An intentional lane change is also recognized, for example, through setting of the turn signal. DE 102 05 225 A1 and DE 10 2008 051 700 A1 are pointed out for technical background in this regard.

In this case, a time window from the moment of turn signal activation with a specified duration for warning suppression is likewise started. This time window is hereinafter referred to as a "warning-suppressing turn signal effect time".

According to the invention, the distance-shortening turn signal effect time and the warning-suppressing turn signal effect time are equally specified.

By means of the invention, these two time windows are coordinated with one another in order to achieve understandable reactions with respect to the setting of the turn signal.

It is thereby prevented that the lane change warning system begin to warn again although the distance-related speed control system is still driving with a shortened target distance for a harmonious overtaking maneuver. Or, it is conversely prevented that the distance-related speed control system is returned back to the normal target distance because the driver has not yet overtaken the vehicle ahead of it, however the lane change warning system continues to suppress the warning in the case that the driving lane markers are approached too closely.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
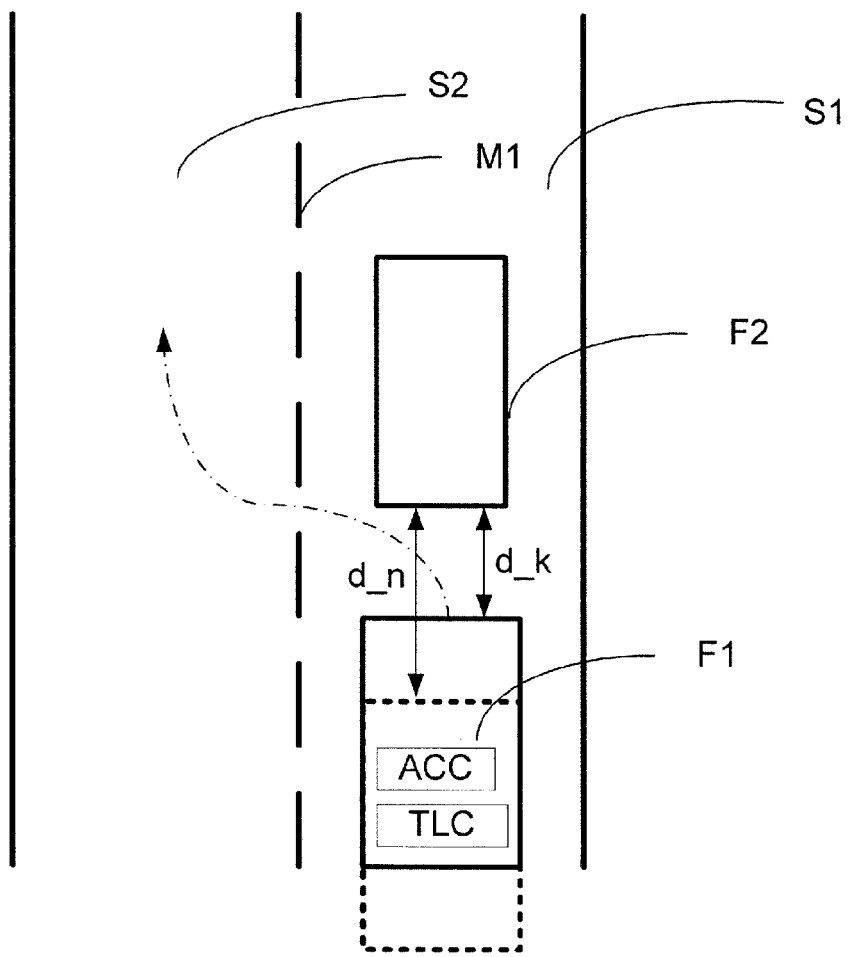
FIGS. 1A and 1B are a schematic diagram and graph, respectively, illustrating a preferred embodiment of the invention, wherein a motor vehicle is shown during an intended lane change situation.

In FIG. 1A, a motor vehicle F1 according to the invention is schematically shown. The motor vehicle F1 is currently driving in a first lane S1 and will change to the adjacent lane S2 after setting the turn signal BL.

The motor vehicle F1 has a distance-related speed control system ACC and a lane departure warning system TLC with at least one programmed electronic control unit corresponding to the invention. Another vehicle F2 is driving ahead of this motor vehicle F1. The distance-related distance control is active. Before setting the turn signal BL, the target distance d_n normally chosen by the driver is set. After the turn signal BL is set, a shortened target distance d_k is set for a specified distance-shortened turn signal effect time t_ACC in order to prepare for overtaking.

With the setting of the turn signal BL, the warning-suppressing of the lane departure warning system TLC is started for a specified warning-suppressing turn signal effect time t_TLC: By setting the turn signal BL, the driver of the motor vehicle F1 signals an intended lane change. He begins a lane change from the first lane S1 to the adjacent lane S2 of a multi-lane road. During approach of the motor vehicle F1 to the first lane marker M1, the lane departure warning system TLC of the motor vehicle F1 emits a warning, which is activated in principle by the danger of an unintended lane departure. However, the warning is suppressed by the start of the warning-suppressing turn signal effect time t_ACC after the setting of the turn signal BL.

Figure 1B:
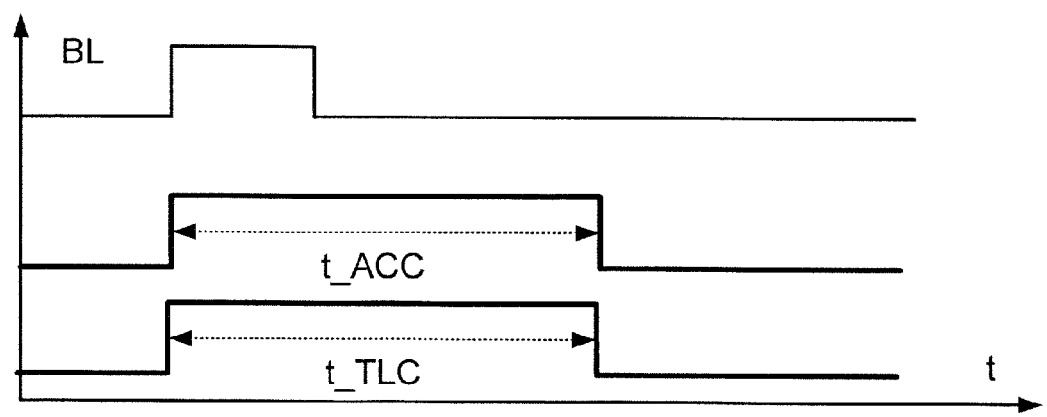

In FIG. 1B, the distance-shortened turn signal effect time t_ACC and the warning-suppressing turn signal effect time t_TLC for this situation are graphically shown, which are started by the setting of the turn signal BL and which have the same duration.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
   a distance-related speed control system, wherein if the motor vehicle is following a vehicle driving in front, a target distance from the vehicle driving in front chosen by a driver is set, and wherein, in response to the turn signal being set and for a distance-shortening turn signal effect time, a shortened target distance is set and a short-term acceleration of the motor vehicle is automatically provided by the distance-related speed control system until the shortened target distance is satisfied, and
   a lane departure warning system, wherein a warning that is activated if there is a risk of unintentional lane departure is suppressed for a specified warning-suppressing turn signal effect time after the setting of the turn signal, wherein
   the warning-suppressing turn signal effect time begins simultaneously with the distance-shortening turn signal effect time, and the warning-suppressing turn signal effect time and the distance-shortening turn signal effect time are specified to have the same length.

2. A method of operating a motor vehicle equipped with a distance related speed control system and a lane departure warning system, wherein the distance related speed control system sets a target distance from a vehicle driving in front that is chosen by the driver, and wherein the lane departure warning system outputs a warning if there is a risk of an unintentional lane departure, the method comprising the acts of:
   setting, by the distance related speed control system, a shortened target distance from the vehicle driving in front for a distance-shortening turn signal effect time in response to a turn signal being set;
   accelerating, by the distance related speed control system, the motor vehicle until the shortened target distance is satisfied;
   suppressing the warning that is output if there is the risk of the unintentional lane departure for a defined warning-suppressing turn signal effect time after a setting of the turn signal, wherein
   the warning-suppressing turn signal effect time begins simultaneously with the distance-shortening turn signal effect time, and
   the warning-suppressing turn signal effect time and the distance-shortening turn signal effect time are defined by a same length.

3. A method of operating a motor vehicle equipped with a distance-related speed control system and a lane departure warning system that is configured to emit warnings in response to a detected risk of unintentional lane departure, the method comprising the acts of:
   receiving, by the distance-related speed control system from a driver of the vehicle, a user-defined target distance defining a following distance to a vehicle driving in front of the motor vehicle;
   setting, for a predefined period of time and in response to a turn signal being set by the driver, a shortened target distance that is less than the following distance;
   accelerating, by the distance related speed control system, the motor vehicle until the shortened target distance is satisfied; and
   suppressing, for the predefined period of time and in response to said turn signal being set by the driver, warnings from the lane departure warning system,
   wherein, at an expiration of the predefined period of time, the distance-related speed control system automatically reverts to the target distance and the warnings from the lane departure warning system are no longer suppressed.

* * * * *